(12) United States Patent
Masias et al.

(10) Patent No.: US 7,339,353 B1
(45) Date of Patent: Mar. 4, 2008

(54) POWER SYSTEM FOR MANAGING POWER FROM MULTIPLE POWER SOURCES

(75) Inventors: Alvaro Masias, Los Angeles, CA (US); Hiroshi Mukainakano, Valencia, CA (US); Hisashi Tsukamoto, Santa Clarita, CA (US)

(73) Assignee: Quallion LLC, Sylmar, CA (US)

( * ) Notice: Subject to any disclaimer, the term of this patent is extended or adjusted under 35 U.S.C. 154(b) by 386 days.

(21) Appl. No.: 10/798,499

(22) Filed: Mar. 10, 2004

(51) Int. Cl.
*H01M 10/46* (2006.01)

(52) U.S. Cl. .................................... 320/138

(58) Field of Classification Search ............... 320/101, 320/103, 107, 114, 115, 116, 135, 138
See application file for complete search history.

(56) References Cited

U.S. PATENT DOCUMENTS

| | | |
|---|---|---|
| 4,851,756 A | 7/1989 | Schaller et al. |
| 4,977,899 A | 12/1990 | Digby et al. |
| 5,289,046 A | 2/1994 | Gregorich et al. |
| 5,411,537 A | 5/1995 | Munshi et al. |
| 5,455,637 A | 10/1995 | Kallman et al. |
| 5,455,638 A | 10/1995 | Kallman et al. |
| 5,610,496 A | 3/1997 | Hofbauer et al. |
| 5,835,185 A | 11/1998 | Kallman et al. |
| 5,850,113 A | 12/1998 | Weimer et al. |
| 5,861,684 A | 1/1999 | Slade et al. |
| 5,874,786 A * | 2/1999 | McVey et al. ............... 307/18 |
| 5,900,720 A | 5/1999 | Kallman et al. |
| 5,914,542 A | 6/1999 | Weimer et al. |
| 5,973,476 A | 10/1999 | Irvin |
| 5,996,115 A | 12/1999 | Mazelsky |
| 6,265,846 B1 | 7/2001 | Flechsig et al. |
| 6,272,781 B1 | 8/2001 | Resnick |
| 6,388,422 B1 | 5/2002 | Lew |
| 6,431,044 B2 | 8/2002 | Poole |
| 6,515,456 B1 | 2/2003 | Mixon |
| 6,528,970 B1 | 3/2003 | Liu et al. |
| 6,538,414 B1 | 3/2003 | Tsuruga et al. |
| 6,549,807 B1 | 4/2003 | Kroll |
| 6,559,621 B2 | 5/2003 | Corless et al. |
| 6,563,290 B2 | 5/2003 | Sakakibara et al. |
| 6,563,291 B2 | 5/2003 | Tamura et al. |
| 6,580,251 B2 | 6/2003 | Takeuchi |
| 6,584,329 B1 | 6/2003 | Wendelrup et al. |
| 6,586,850 B1 | 7/2003 | Powers |
| 2002/0047309 A1 | 4/2002 | Droppo et al. |
| 2002/0076071 A1 | 6/2002 | Single |
| 2002/0185916 A1 | 12/2002 | Barton et al. |
| 2003/0020332 A1 | 1/2003 | Giannopoulos et al. |
| 2003/0052547 A1 | 3/2003 | Fischer et al. |
| 2003/0085621 A1 | 5/2003 | Potega |
| 2003/0111908 A1 | 6/2003 | Christensen |
| 2005/0141154 A1 * | 6/2005 | Consadori et al. ............ 361/62 |

FOREIGN PATENT DOCUMENTS

WO   WO 01/83029 A1   11/2001

OTHER PUBLICATIONS

Tempower, http://www.tempower.net.futuresite.register.com/_wsn/page4.html, 2 pages.
Kohler Event Services, Power Distribution, http://www.kohlereventservices.com/equip_service/power/power_distribution.html?id=pst, 1 page.
Cal-Distro, Heavy Duty Outdoor/Construction Series, Power Distribution Equipment, http://www.cal-distro.com/, 2 pages.
Cal-Distro, Heavy Duty Outdoor/Construction Series, Heavy Duty, http://www.cal-distro.com/heavy_duty.htm, 2 pages.
Cal-Distro, Heavy Duty Outdoor/Construction Series, Heavy Duty 2, http://www.cal-distro.com/heavy_duty_2.htm, 2 pages.

* cited by examiner

*Primary Examiner*—Edward H Tso
(74) *Attorney, Agent, or Firm*—Gavrilovich Dodd & Lindsey LLP

(57) ABSTRACT

A power source system including a power distribution apparatus has an energy management system for managing the provision of power from multiple power sources to multiple electrical devices. The power distribution apparatus may have a combination of primary and secondary sources connected to it. It may also have a variety of electrical devices connected to it, receiving power through the power distribution apparatus.

25 Claims, 7 Drawing Sheets

POWER SYSTEM FOR MANAGING POWER FROM MULTIPLE POWER SOURCES

BACKGROUND

This invention relates to a power system capable of managing power received from multiple power sources and distributing power for use by multiple devices.

As used in this application, an "electrical device" is a circuit, apparatus, system or any other thing made for a particular purpose that uses power to perform or to assist in the performance of some function. In this description, these will be called "electrical devices" or simply "devices". Further, the "power" used by the devices is electrical power. Those skilled in the art will realize that, from the standpoint of power distribution, these devices may also be considered to be loads.

Many electrical devices are powered by an internal power source such as a power supply, storage cell, or battery. The design of such a device emphasizes the effective performance of a function by means of circuits, processes, sensors, and/or transducers. Electrical device power design emphasizes stability and quality of power delivered, size of the power source and dissipation of thermal byproduct. Flexibility has only recently become a factor affecting power design, with the ability to obtain power from one or more multiple sources being driven by requirements for portability and adaptive use of electrical devices.

For example, a device may, under certain operating circumstances operate most effectively with power drawn from a primary battery. But, changes in the device's environmental or operational circumstances may make a secondary battery more effective. In this regard, the term "primary battery" refers to an electrochemical device designed, engineered, and intended to operate through one discharge cycle and then be discarded without being recharged. The term "secondary battery" refers to an electrochemical device designed, engineered and intended to operate through many discharge/charge cycles before being discarded. However, this is not meant to preclude the possibility that a primary battery may be recharged or that a secondary battery may be discarded after a single use. A flexible power design would make both battery types available and would intelligently manage the selection of one as a power source for the device. Further, once a battery is selected as a power source, a flexible power design would manage the transition from one to another type of battery in response to changes in device operating and/or environmental conditions.

To date, however, little attention has been given to the flexible management of power provided to or in electrical devices from multiple disparate power sources.

SUMMARY

A power system for use by or with one or more electrical devices includes the capability of managing power received from multiple disparate power sources and distributing power for use by one or more devices. The power system is, from one aspect, a power distribution apparatus for receiving power from multiple disparate power sources to distribute to one or more devices requiring power for operation. From another aspect, the power system is a power source system including multiple disparate power sources and having the capability of selectively routing power from one or more of the power sources for use by one or more devices requiring power for operation.

A power system embodied as a power distribution apparatus includes an energy management system, provision for receiving power from multiple disparate power sources including one or more power source inlets adapted to detachably connect one or more sources of power to the energy management system, and multiple outlets adapted to detachably connect power to one or more devices requiring power. For purposes of this description, an "inlet" is a connection, physical, conductive, inductive or otherwise, for providing power from a power source to the power distribution apparatus. An "outlet" is a connection, physical, conductive, inductive or otherwise, for providing power from the power distribution apparatus. The energy management system may have a power source selector for selecting a power source to power a device connected to one of the outlets. The power source selector may have the additional function of charging one or more secondary batteries connected to one of the inlets. The energy management system may further have a charge controller for controlling the magnitude of the charge current to a secondary battery connected to one of the inlets. The energy management system may further have a measuring device for determining remaining capacity in a battery connected to at least one of the inlets. The remaining capacity may be determined through means commonly known in the field. For example, if the initial capacity is known, a current counter could be employed, with a projected rate of decline of battery performance to increase accuracy. Also, for certain chemistries (e.g. lithium ion batteries) it is possible to estimate remaining capacity by measuring voltage. The power distribution apparatus may further comprise an indicator for conveying the measured remaining capacity. The power distribution apparatus may further comprise a bus for relaying the measured remaining capacity to a battery connected to one of the battery inlets. A first battery inlet may be adapted to detachably connect a secondary battery when a primary battery is not attached. A second battery inlet may be adapted to detachably connect a primary battery when a secondary battery is not attached. The power distribution apparatus may further comprise an external power source inlet for receiving power in AC or DC form. The power distribution apparatus may have separate inlets for accepting various voltages and frequencies to fit the standards of different countries. Alternatively, the power distribution apparatus may be provided with a single external power source inlet that can receive various voltages and manage the voltage to provide power to connected devices or to recharge an attached secondary battery.

A power system embodied as a power source system includes, in addition to the power distribution apparatus described above, a first battery detachably connected to the energy management system via a first inlet, and a second battery detachably connected to the energy management system via a second inlet. Either or both batteries may be a primary battery, such as a lithium-CFx primary battery, and/or a secondary battery, such as lithium ion or lithium ion polymer battery. The power source system may further comprise a third power source inlet.

A power system kit includes a power distribution apparatus with an energy management system, a first battery inlet adapted to detachably connect a primary battery to the energy management system, a second battery inlet adapted to detachably connect a secondary battery to the energy management system, one or more outlets adapted to detachably connect a device requiring power, a first battery for detachably connecting to the energy management system via the first inlet, a second battery for detachably connecting to the energy management system via the second inlet, and a device for detachably connecting to at least one of the outlets. The first battery may be a primary battery and the second battery may be a secondary battery. The primary battery may comprise an automobile battery. The power distribution apparatus may comprise an additional inlet for receiving power from an external power source, such as an alternator. The device may comprise any device that requires electrical power, and is particularly suitable for mobile applications. Some examples of such applications include communication, navigation, entertainment, heating, cooling, cooking, illumination, weapons systems, target acquisition, and medical devices such as portable defibrillators and cardiac monitors. The power distribution apparatus may further comprise an external power source inlet.

A method for operating a power system to provide electrical power to a plurality of devices includes providing a power distribution system, detachably attaching a first battery to a first inlet of the power distribution system, detachably attaching a second battery to a second inlet of the power distribution system, detachably attaching one or more power consuming devices to outlets of the power distribution system, and the power distribution system coupling power to a power consuming device from either the first battery or the second battery.

Any inlet in any embodiment described below may connect power to the power distribution apparatus by any number of connections including, without limitation, conductive connections and inductive connections.

DETAILED DESCRIPTION

The following text and the above-described drawings present examples and are not intended to describe all possible modifications and variations consistent with the spirit and purpose of the invention. The scope of the invention should be determined with reference to the claims.

A power system to be described operates with or includes multiple power sources, which may include electrochemical storage devices and external power sources. The types of electrochemical storage devices may include primary batteries, secondary batteries, and any combinations thereof, and may comprise one or more cells, capacitors, hybrids of the two, fuel cells, and the like, and any combinations thereof. Fuel cells may be preferred for certain applications but less preferred for others because of their need for mechanical refueling, such as replenishing hydrogen. For convenience, the word "battery" as used herein may refer to any or all of these electrochemical storage devices. External power sources used in the power system may include charger modules, generators, alternators, turbines, and the like, and combinations thereof. These multiple disparate power sources are flexibly managed by an energy management system (EMS) that optimizes energy use dependent on the available power sources and the needs of the devices receiving power.

Figure 1:
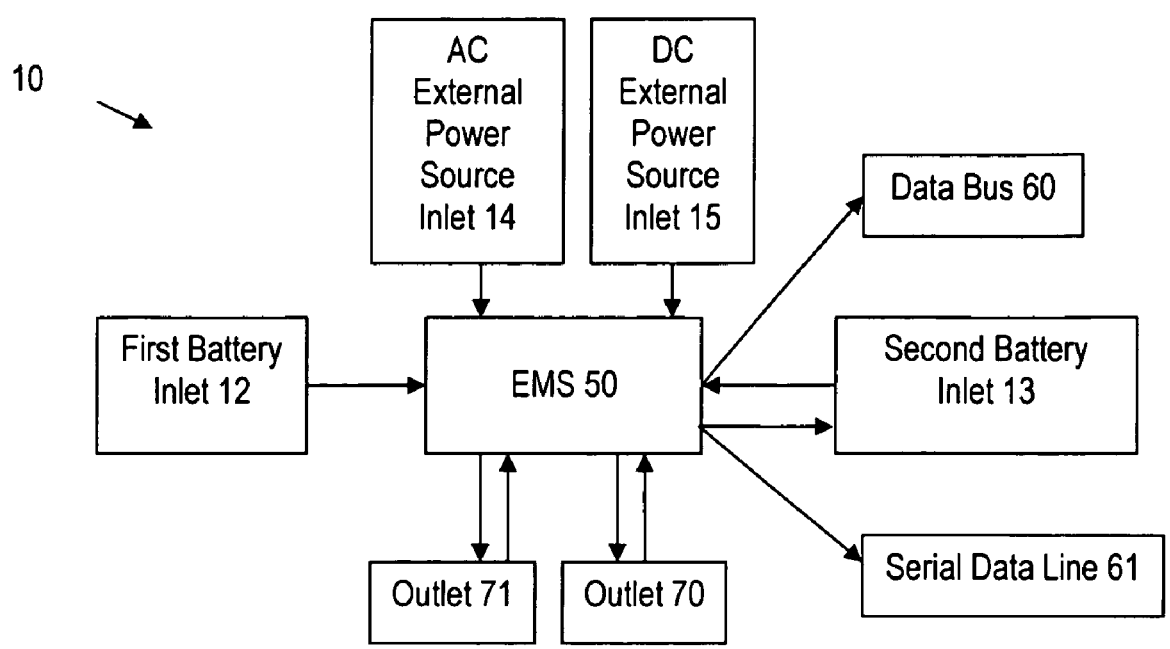
FIG. 1 is a simplified block diagram of the power distribution apparatus of the present invention.

FIG. 1 shows a power distribution apparatus 10, including an EMS 50 having first and second battery inlets, 12 and 13, respectively, AC and DC external power source inlets 14 and 15, respectively, a plurality of outlets 70 and 71, a data bus 60, and a serial data line 61. An EMS 50 is provided for managing the allocation of power from one or more power sources connected at the inlets and for managing the supply of power to a plurality of outlets at multiple and customizable voltage levels. The inlets may connect the various power sources to the EMS 50 by continuous conductive paths, or by conductive paths that include inductive sections, or both. Similarly, the outlets may connect the various devices to the EMS 50 by continuous conductive paths, or by conductive paths that include inductive sections, or both. Inductive power source coupling is taught, for example, in commonly-owned, copending PCT Patent Application No. PCT/US03/30137, filed Sep. 18, 2003, which claims the benefit of U.S. Provisional Application No. 60/412,521, filed Sep. 19, 2002, both of which are incorporated herein by reference. The EMS 50 is able to identify the type of each power source attached at inlets 12 and 13 by measuring the electrical characteristics such as internal resistance, momentary cell charging (characteristic dV/dt), or by using mechanical means, or by any other means known in the art. The EMS is enabled to allocate each source as needed for providing power to output devices attached at outlets 70 and 71, or for recharging any secondary battery in the power system, such as one attached at inlet 12 or 13, one within the EMS itself, or one within a device attached at outlet 70 or 71. Additionally, the power system can be switched to manual control to suit specific situations.

With further reference to FIG. 1, an example of a power distribution apparatus 10 makes it possible to combine the particular characteristics of various disparate types of energy sources. While secondary batteries generally have inherent cost-savings because of their rechargeability, primary batteries typically have higher energy densities. Furthermore, secondary batteries can typically charge and discharge at rates from 0 to 5 C while primary batteries typically have a preferred range of 0 to C/50. While a primary battery may operate at rates above C/50, it is not generally considered cost-effective, since the battery will be used up quickly and not be rechargeable. In this regard, C refers to C-Rate, which is a measure of the current rate that a battery can put out referenced against its own capacity. A rate of 1 C is equivalent to the discharge or charge rate that will fill or empty the battery completely in one hour, likewise a rate of 0.5 C will last for 2 hours, whereas a rate of 2 C will only last for 30 minutes. For example, a battery with a rated capacity of 10 mAh could discharge at rate of 0.1 C (equivalent to imA) for 10 hours or it could be charged at rate of 2 C (20 mA) in 30 minutes. By providing access to a secondary battery as well as to a primary battery, the power distribution apparatus 10 takes advantage of the inherent cost-savings in rechargeable batteries while providing flexibility and improved operational time. Adding an external power source to the power distribution apparatus 10 helps conserve the primary and secondary batteries, ensuring their availability when needed for varying conditions and applications.

Figures 2, 3:
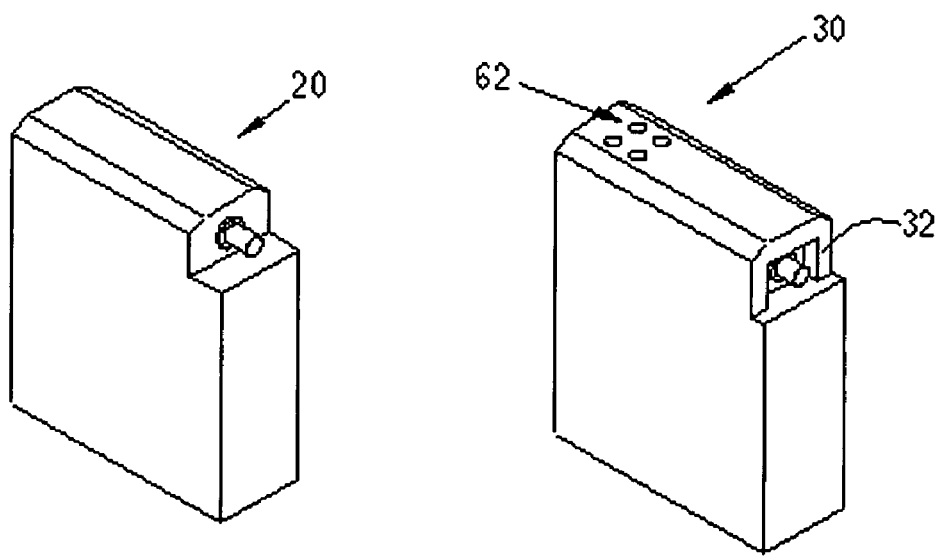
FIG. 2 shows a primary battery for use with the power distribution apparatus.
FIG. 3 shows a secondary battery for use with the power distribution apparatus.

As shown in FIGS. 2 and 3, a primary battery 20 and a secondary battery 30 for use with the power distribution apparatus 10 preferably are dimensioned to allow placement of either type of battery in the same battery inlet. The two types of battery may differ in such a way as to provide mechanical differentiation between them by the EMS while still providing a single connectivity architecture for either and for both types of batteries. As shown in FIG. 3, for example, the feature 32 (illustrated as a casing projection around a connector) may mechanically interact with the power distribution apparatus inlet to indicate that the battery is a secondary battery 30, whereas the primary battery 20 of FIG. 2 has no such feature. Primary battery 20 can utilize any primary battery chemistry, such as $CF_x$ or Zn-air, and secondary battery 30 can utilize any secondary battery chemistry, such as nickel-based oxides.

As shown in FIG. 1, battery data or information, such as state of charge, remaining capacity, temperature, voltage, current, recharging status, and change of temperature or voltage with time (especially for NiCd or nickel metal hydride chemistries), is obtained by the EMS for both primary and secondary batteries. This information may be provided via a data bus 60 to an end user by any appropriate output device or process. One example of such an output device is a readout, for example a diagnostic LED array, which may be located on the power distribution apparatus itself. Alternatively or additionally, the data bus 60 may relay the data to any directly connected battery or device or a remotely connected device. The LEDS 62 on battery 30 shown in FIG. 3 are one example of how the data relayed by the EMS via data bus 60 can be displayed directly on a connected battery. Alternatively or additionally, a serial data line 61 may be provided to relay battery data or information such as remaining battery capacity, temperature, or charging time to an output device or to a processing, storage, or communication device that is connected with data line 61 or the EMS, such as a display on the power distribution apparatus. This information may then be outputted visually using a display on the battery or other device to show remaining battery capacity.

Figure 4:
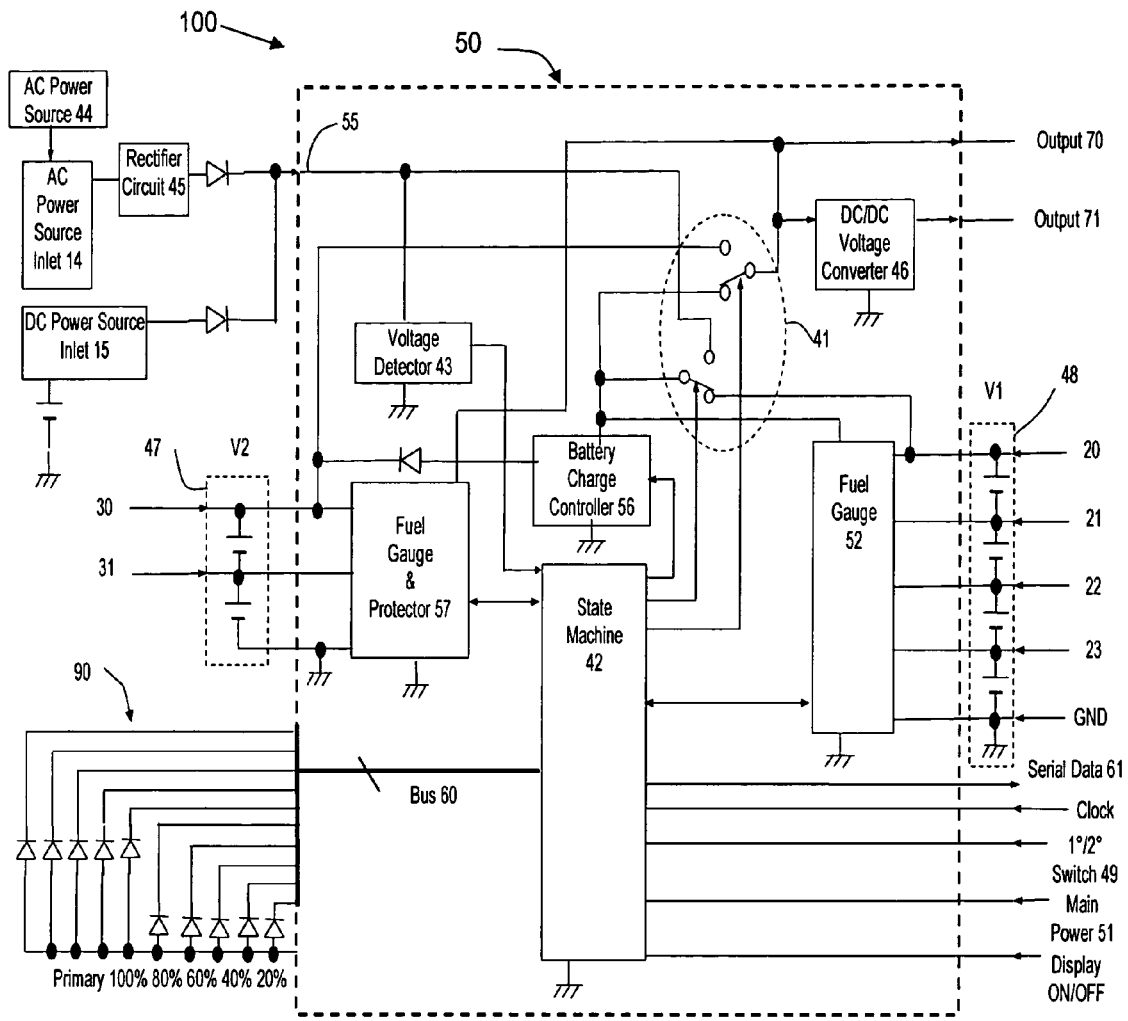
FIG. 4 is a block diagram of the power source system of the present invention.

As shown in FIG. 4, a power source system 100 provides power from different sources to different devices having different voltage and current requirements. The power source system 100 includes the EMS 50, shown in detail. The EMS 50 is controlled by a clocked programmable state machine 42 which is connected to control the states of power source selector switches 41. A voltage detector 43 is connected to the state machine 42 and to an input line 55 that receives power from an external DC source connected at inlet 15 and an external AC source connected at inlet 14 and rectified using rectifier circuit 45. The EMS 50 further includes a fuel gauge circuit 52 connected to monitor one or more primary batteries and connected to the state machine 42 to provide information about the primary batteries. A fuel gauge and protector circuit 57 is connected to monitor and provide recharge protection for one or more secondary batteries and connected to the state machine 42 to provide information about the secondary batteries. A battery charge controller 56 is connected to the switches 41, the fuel gauge 52, and to the one or more secondary batteries, and also to the state machine 42 for control thereby. A DC/DC voltage converter 46 is connected between the switches 41 and the outlet 71. A data bus 60 is connected to the state machine 42 for operation and control thereby. A serial data line 61 is connected to the state machine 42 for operation and control thereby. The state machine 42 controls the operations and functions of the EMS 50 in response to information and data received from the voltage detector 43, the fuel gauge 52, and the fuel gauge and protector circuit 57, and switch settings from external switches 49 and 51. The state machine 42 controls, sets, and changes the states of the power source selector switches 41, the battery charge controller 56, the data bus 60, and the serial data line 61.

In the power source system 100 of FIG. 4, devices can be operated concurrently by connection at outlets 70 and 71. The EMS 50 may include a voltage regulator device or process to provide multiple, constant, preprogrammed output voltages in any range, preferably ranging from 15 V to 18 V, dependent on power needs of various equipment. Additionally or alternatively, a high voltage may be provided by the EMS 50 internally switching its circuitry to put a greater number of its available energy storage devices in series. A high current may be supplied by the EMS placing a greater number of energy storage devices in parallel.

FIG. 4 shows the power source system 100 with four primary batteries 20, 21, 22, 23 connected in series to provide an aggregate voltage V1 and two secondary batteries 30, 31 connected in series to provide an aggregate voltage V2. The fuel gauge 52 monitors the discharge current of the individual primary batteries and calculates how much energy has been discharged from each primary battery. The battery charge controller 56 provides constant current and constant voltage to the secondary batteries. The fuel gauge and protector circuit 57 monitors the discharge and charge current of the individual secondary batteries and protects them from overcharging and over-discharging. Note that in other embodiments, the batteries may be connected in parallel, or may not be connected to each other at all except for through the power distribution apparatus. In that case, switches may be provided within the power distribution apparatus for connecting cells in series or parallel or for using only some of the cells.

The EMS 50 utilizes switching technology well known in the field of circuit design to efficiently utilize different types of energy sources and even individual energy sources within a given type. The EMS 50 chooses the optimal power source for the output required of the connected devices and to conserve the rechargeable battery. Using the power source selector switches 41, the EMS 50 directs power to a device attached to outlet 70 and/or outlet 71 from any attached source, including an external source such as the AC source 44, one or more primary batteries, or one or more secondary batteries, based on the level of charge of the secondary battery, the power demand from the attached device or devices, and the power supplied by the external source and primary battery. A manual switch 49 connected to the state machine 42 for selecting between primary and secondary sources is also provided.

Redundancy is provided by the power source system 100, resulting in uninterrupted power even when changing batteries. During tethered use of the power source system 100, any of the three components may be removed or swapped out without interruption of power. During mobile use of the power source system 100, either battery may be swapped out, with power provided by the remaining battery during the transitions. The switching from one power source to another or from a combination to a single source or from a single source to a combination of sources may be done gradually using any method known in the art, such as that taught in U.S. Pat. No. 4,851,756 to Schaller et al., which is hereby incorporated herein by reference in its entirety.

The battery charge controller 56 has the ability to charge an attached secondary battery from either an external source (AC or DC) or from an attached primary battery. The EMS 50 can direct power from a source to a device at the same time that the secondary battery is being charged by the same or a different source. The charge controller 56 controls the source and magnitude of the recharging current provided for secondary battery recharge. Including a primary battery to recharge the secondary batteries allows continuous recharging and power. The EMS 50 can execute and optimize a recharging algorithm and a charge state of one or more secondary batteries including the secondary battery 30. For example, the EMS 50 may allow the battery to drain somewhat if it is better for the battery to not remain constantly fully charged.

Although the recharging can take place directly with a wired connection, the recharging may also be done inductively, potentially eliminating feed-throughs and providing waterproof coupling between the power source and the power distribution apparatus. Furthermore, a power distribution apparatus that has inductive charging and an EMS that can manage multiple energy characteristics, such as various voltage, frequency, and current, provides for universal charging in which a specific plug is not required to be inserted into a specific inlet. Additionally, because no plug is required, the systems can be stacked efficiently for easier transport and so that there is no chance of a plug breaking off. Inductive charging is also particularly useful in automobile applications, such as electric vehicles and hybrid electric vehicles, in which simply by parking the car with a secondary coil aligned with a primary coil at a charging station, the car battery is automatically charged. Such automotive charging coils are typically 1 m×1 m×0.1 m and can supply 10 A. The power distribution apparatus is designed such that when both the primary and secondary battery are in place, a sending coil from the primary battery lines up with a receiving coil to charge the secondary battery. The system charges the rechargeable power source without requiring monitoring of the position of the charging coil in relation to the receiving coil and without interruption of power to the attached devices. This same pair of coils may be used for other communication between the charger and the battery, as is known in the art. Alternatively, a second pair of primary and secondary coils (not illustrated) may be provided for communication without having to provide a complex algorithm to accommodate both functions on the same pair of coils. In this regard, see the incorporated patent application.

The EMS 50 also provides protection against overcharge voltage, over discharge voltage, and current. Furthermore, the device may be provided with a coolant system such as a fan, heat sink, water cooler, or other heat transfer device. The device may be further be provided with a warning system to communicate a warning message in the event that the temperature increases to a predetermined temperature, such as more than 5° C. above the surrounding environment.

Data, such as state of charge, remaining capacity, temperature, voltage, current, and recharging status may be provided via the data bus 60 to a user by an output device or process connected to the data bus. For example, a readout in the form of a LED array 90 connected to the data bus 60 is shown. Alternatively or additionally, the data bus 60 may relay the data to any directly connected battery or device or a remotely connected device. Alternatively or additionally, the serial data line 61 may be provided to relay digital data such as remaining battery capacity, temperature, or charging time to a device or process connected to the data line 61, such as a display. This information may then be outputted visually using a display on the battery or other device to quickly show how much power is remaining.

The power source system 100 utilizes various available sources of power based on power criteria including output power requirements, recharging requirements, and preset selection of the available power sources for given conditions. For example, one power criterion may be to supply the required energy while conserving one or more secondary batteries and maintaining it fully charged as much as possible. A secondary battery is more versatile than a primary battery, with better high rate capability, with the typical rate being 0 to C/50 for a 1° battery and 0 to 5 C for a secondary battery. Therefore, it is advantageous to ensure that, if only one battery has charge available, it is a secondary battery. Furthermore, powering the device from a primary battery instead of from a secondary battery and then recharging the secondary battery from the primary battery through the EMS 50 saves energy because it avoids an approximately 20% energy loss in the EMS 50 resulting from inefficiency of AC/DC conversion.

Figure 5:
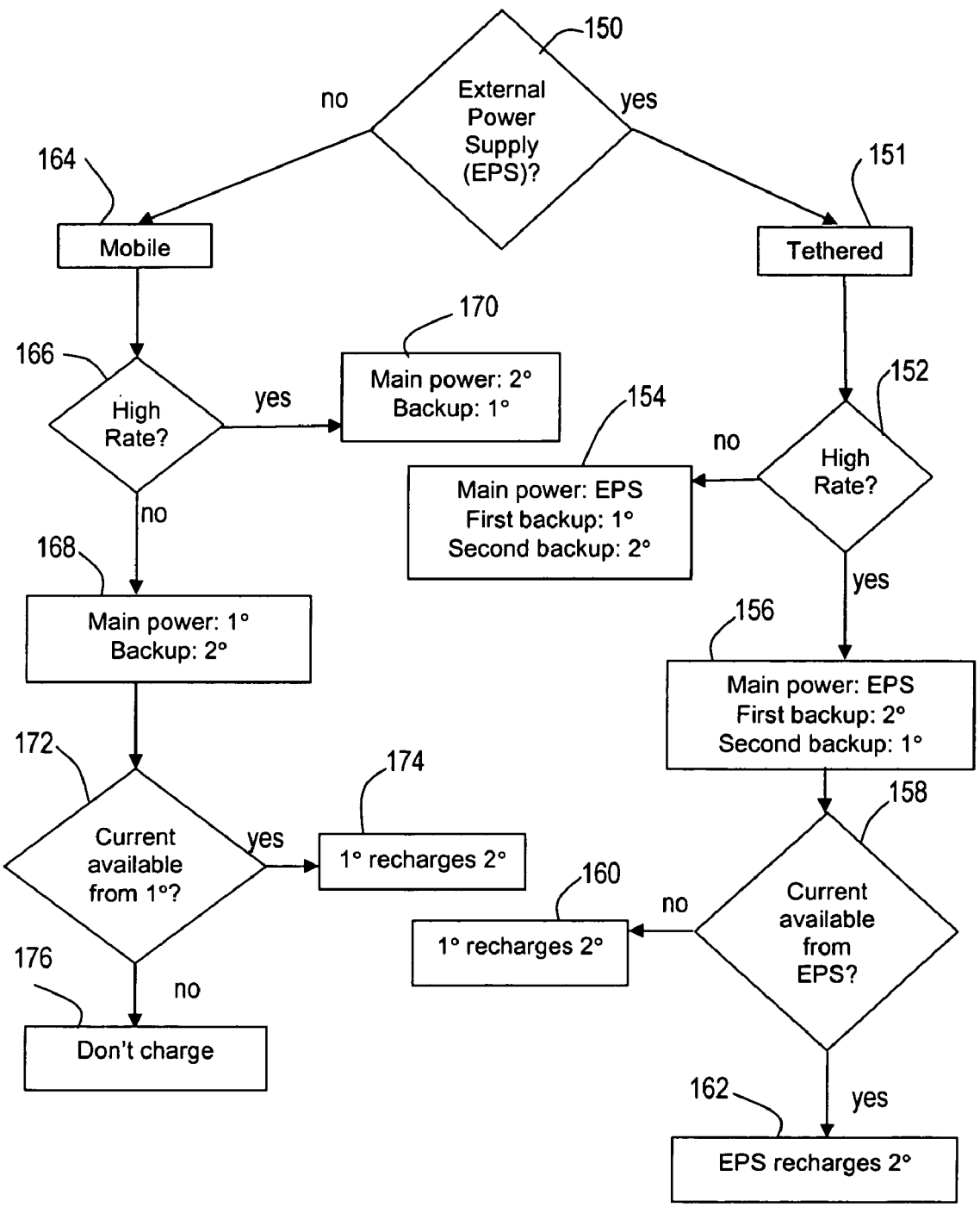
FIG. 5 illustrates a method of operating a power source system using the power distribution apparatus.

Refer now to FIG. 5, which illustrates a method executed by the EMS 50 for operating a power source system using a power distribution apparatus to manage a plurality of power sources and provide power from the plurality of sources to a plurality of devices. In this method, when the power source system 100 is used with an external power supply (EPS), the system is considered "tethered". Regulated power may be provided by such a tethered system indefinitely, at the cost of mobility. Thus, in decision 150, if an EPS is connected, the positive exit is taken, a "tethered" flag is set in step 151, and the method proceeds to decision 152. When one or more external power supplies are present, they are preferentially chosen as the main power source to be utilized for power output. In case the external power source should become unavailable or inadequate for the power needs, either the primary or secondary battery may be designated as a backup power supply. Thus, in decision 152, a determination is made as to the rate at which power is to be supplied. For low rate applications, the negative exit is taken from decision 152 and, in step 154 a primary battery (indicated by 1° in FIG. 5) is designated as the first backup power source, while a secondary battery (indicated by 2° in FIG. 5) is designated as the second backup power source. For high rate applications, the positive exit is taken from decision 152 and, in step 156, the secondary battery designated as the first backup power source, and the primary battery is designated as the second backup power source. The rate cutoff for determining whether the application is low or high rate may be variable and set for a particular application. For most applications, low rate may be, for example, 0 to C/50, and high rate above C/50. However, in special cases where conserving the secondary battery is more preferred than usual, such as when there is ah abundance of primary batteries and no recharger available, the cutoff from low rate to high rate may be defined at a higher rate, such as C/5.

Current available from the external sources that is in excess of that needed to power output devices is used to maintain the charge on any secondary batteries in the circuit, thus preventing the discharge of primary batteries in the circuit for the purposes of providing power to the devices or charging the secondary batteries. If current is not available from an external power supply, a primary battery may be used to recharge a secondary battery as needed. Thus, according to the method of FIG. 5, following step 156, the current available from the EPS is tested to determine whether there is a margin available for charging the secondary battery. If current is not available, the negative exit is taken, and the primary battery is used for charging the secondary battery in step 160. Otherwise, the positive exit is taken from decision 158 and the EPS is used also to charge the secondary battery in step 162. Note that, for so long as the system is tethered and continues to draw power from the power sources, the method continuously tests the rate by exiting to decision 152 from steps 154 and 162. When power draw falls below a certain predetermined level, or when a load is disconnected, or when a switch indication is given, or when the external power is disconnected, the method ends.

When external power sources are not being used, the power source system 100 can be operated as a mobile unit, relying exclusively on any combination of electrochemical storage devices. In this case, the negative exit is taken from decision 150 and the flag is reset in step 164 to indicate that the system is mobile (not tethered). The method then decides in step 166 whether power is to be supplied to a load at a high rate. When both secondary and primary batteries are attached to the power distribution apparatus away from external power sources, as much as possible, the EMS 50 supplies needed power from one or more primary batteries while keeping the one or more secondary batteries charged. (Hereinafter, the reference will be to "a primary battery" and "a secondary battery" with the understanding that "one or more" is meant in each case). Thus, following the negative exit from decision 166, during low current draw applications, energy is conserved by using a primary battery to provide power to the output devices and charge a secondary battery in step 168. During mobile, high rate use, the positive exit is taken from decision 166 and, in step 170, the secondary battery is used to provide power to the connected output device(s). Note that the method continually tests the rate level by returning to decision 166 from step 170. If the EMS 50 senses the current draw change from high rate use to low rate use, the EMS 50 again conserves energy by switching to the primary battery to power the output devices and charge the secondary battery as needed in step 168. By having the ability to power the device by the primary battery, the life of the rechargeable secondary battery may be prolonged by reducing the number of charging cycles. Thus, the method transitions from step 168 to decision 172 to determine whether the primary battery has the capacity to charge the secondary battery while it acts as the primary source for a load. If current is available, the positive exit is taken from decision 172 and current is drawn from the primary battery for charging the secondary battery in step 174. Other wise, the negative exit is taken from decision 172 and the secondary battery is not charged in step 176. Note that the method cycles from steps 174 and 176 to decision 166 to retest the load rate. When power draw falls below a certain predetermined level, or when a load is disconnected, or when a switch indication is given, or when primary and secondary battery capacities are too low, the method ends. As an added step to the method, once the EMS 50 detects voltage loss in the primary battery to below a predetermined cutoff voltage, it switches over to the secondary battery, while continually supplying power to the output device(s). This test may be performed in decision 166 as the method continuously cycles. Of course, an available primary battery may be inserted into the power source system 100 when needed in order to preserve the secondary battery as a backup, while providing power from the new primary battery. This process of replacing primary batteries while maintaining prolonged periods of uninterrupted power could proceed indefinitely until the end of the rated lifetime of the secondary battery.

Tables 1 and 2 show typical capabilities of battery type combinations, assuming battery dimensions of 12.5 cm×10 cm×4 cm, for a volume of 0.5 liters. A power source system having two batteries of this size or smaller is well suited for carrying or wearing, such as in a vest configuration. In a power source system having a lithium ion secondary battery (LIB) or lithium ion polymer secondary battery (LIPB) along with a $CF_x$ primary battery at 20 W power, the system would be usable for 22.5 hours at a temperature range of −20 to +50° C. Because the primary battery can charge the secondary battery, there is no down time required for recharging.

In a power source system having two secondary batteries, LIB or LIPB, the system would be usable for 15 hours at a temperature range of −20 to +50° C. However, because only secondary batteries are in the system, following 15 hours use, the batteries must be taken off line and recharged for 3 hours.

In a power source system using a LIB or LIPB secondary battery along with a Zn-Air primary battery, the system would be usable for 32.5 hours at a temperature range of −20 to +50° C. However, at low temperature (−20° C. to 0 C), only Battery 1 can be used, so if used continuously below 0° C., the Time of Use would be reduced. Because the primary battery can charge the secondary battery, there is no down time required for recharging.

In a power source system using two primary Zn-Air batteries, the system would be usable for 50 hours, but only at a much lower rate than the previously described combinations, and at a temperature range of only 0 to 50° C. Following 50 hours of use, while there would be no downtime for recharging, the batteries would be replaced.

TABLE 1

Typical Capabilities of Various Battery Types

| Chemistry | Mass (kg) | Energy (Wh) | Volumetric Energy Density (Wh/l) | Gravimetric Energy Density (Wh/kg) | Time of Use @ 20 W (h) | Waterproof |
|---|---|---|---|---|---|---|
| LIB/LIPB | 1 | 150 | 300 | 150 | 7.5 | Yes |
| $CF_x$ | 1.2 | 300 | 600 | 250 | 15.0 | Yes |
| Zn-Air | 1.67 | 500 | 1000 | 300 | 25.0 | No |

TABLE 2

Typical Capabilities of Battery Type Combinations

| Battery 1 | Battery 2 | Time of Use @ 20 W (hr) | Max C-Rate Capability ($hr^{-1}$) | Temperature Capability (° C.) | Recharge Time (hr) |
|---|---|---|---|---|---|
| LIB/LIPB | CFx | 22.5 | 5 | −20 to 50 | 0 |
| LIB/LIPB | LIB/LIPB | 15 | 5 | −20 to 50 | 3 |
| LIB/LIPB | Zn-Air | 32.5* | 5 | −20 to 50** | 0 |
| Zn-Air | Zn-Air | 50 | 0.2 | 0 to 50** | 0 |

*At low temperature (−20° C. to 0° C.), only Battery 1 can be used, so under continuous low-temperature use, the Time of Use would be reduced.
**At 0° C. Zinc-Air loses >75% of its rated capacity.

Figure 6A:
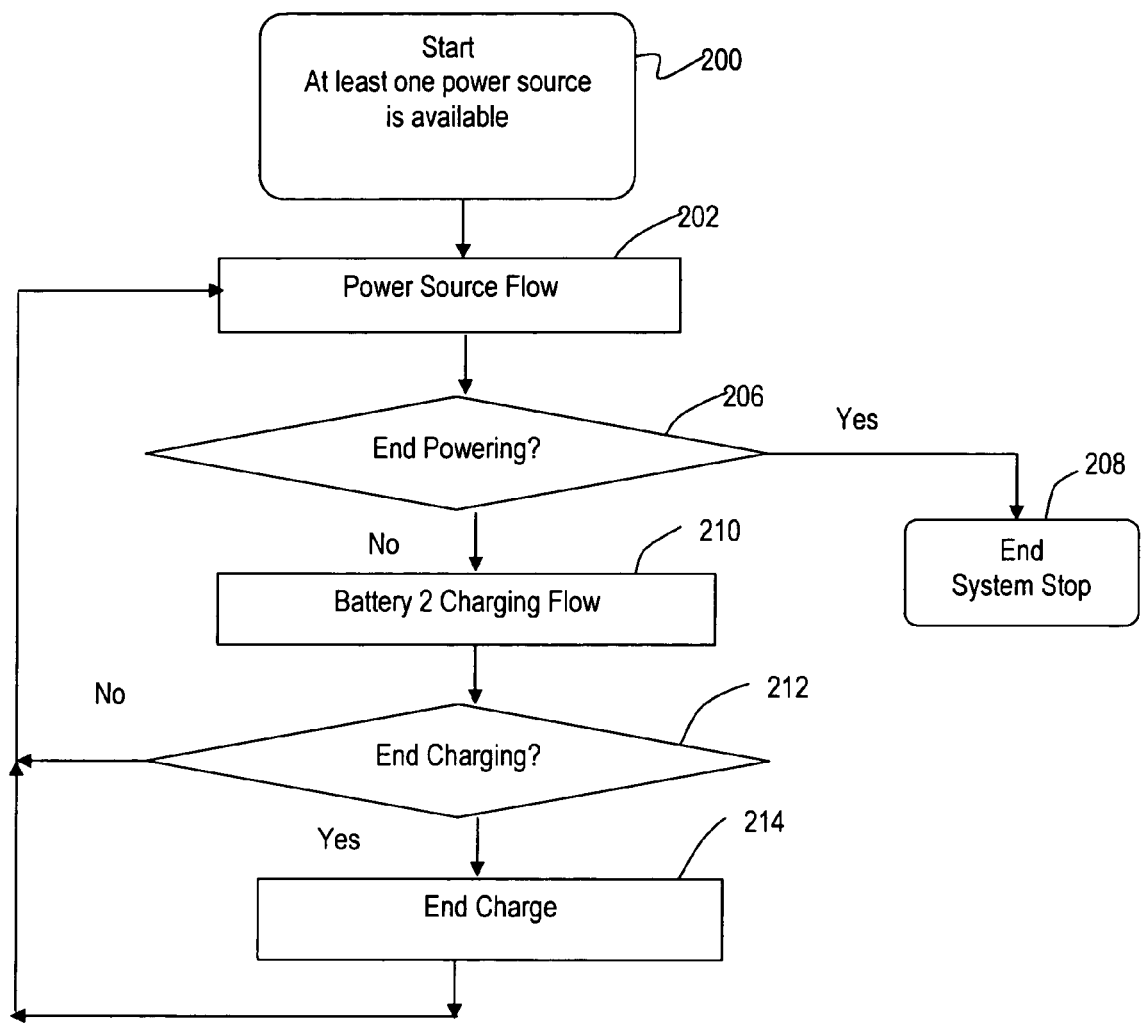
FIGS. 6A-6D illustrate another method of operating a power source system using the power distribution apparatus.
Figure 6B:
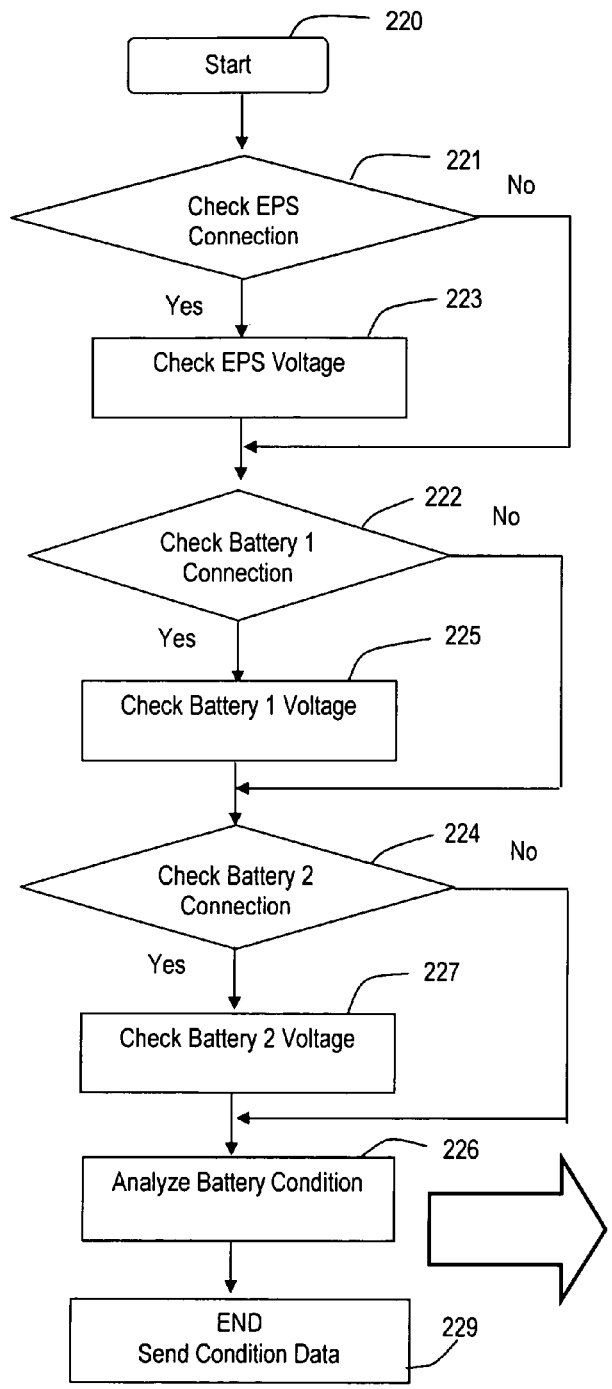
Figure 6C:
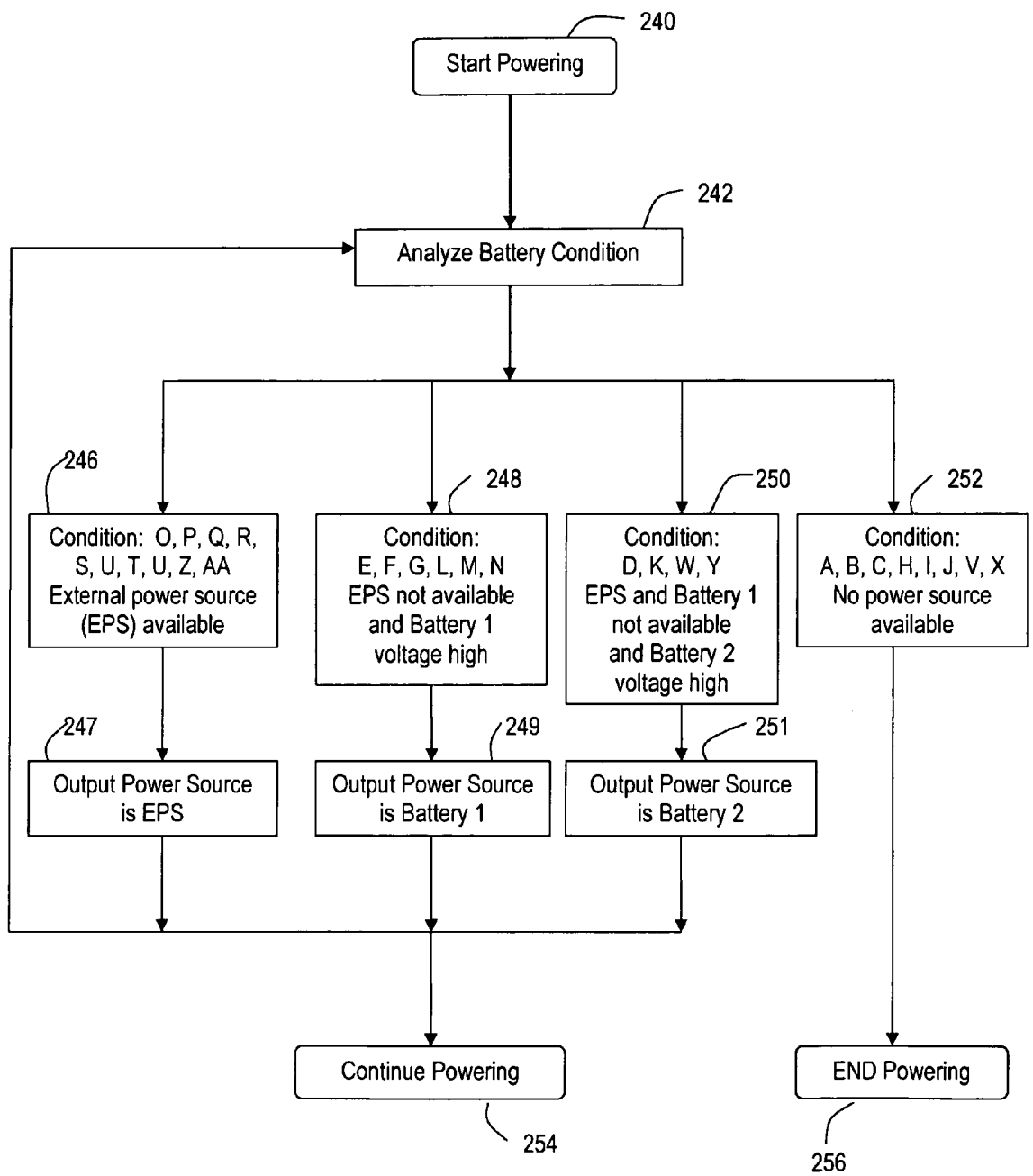
Figure 6D:
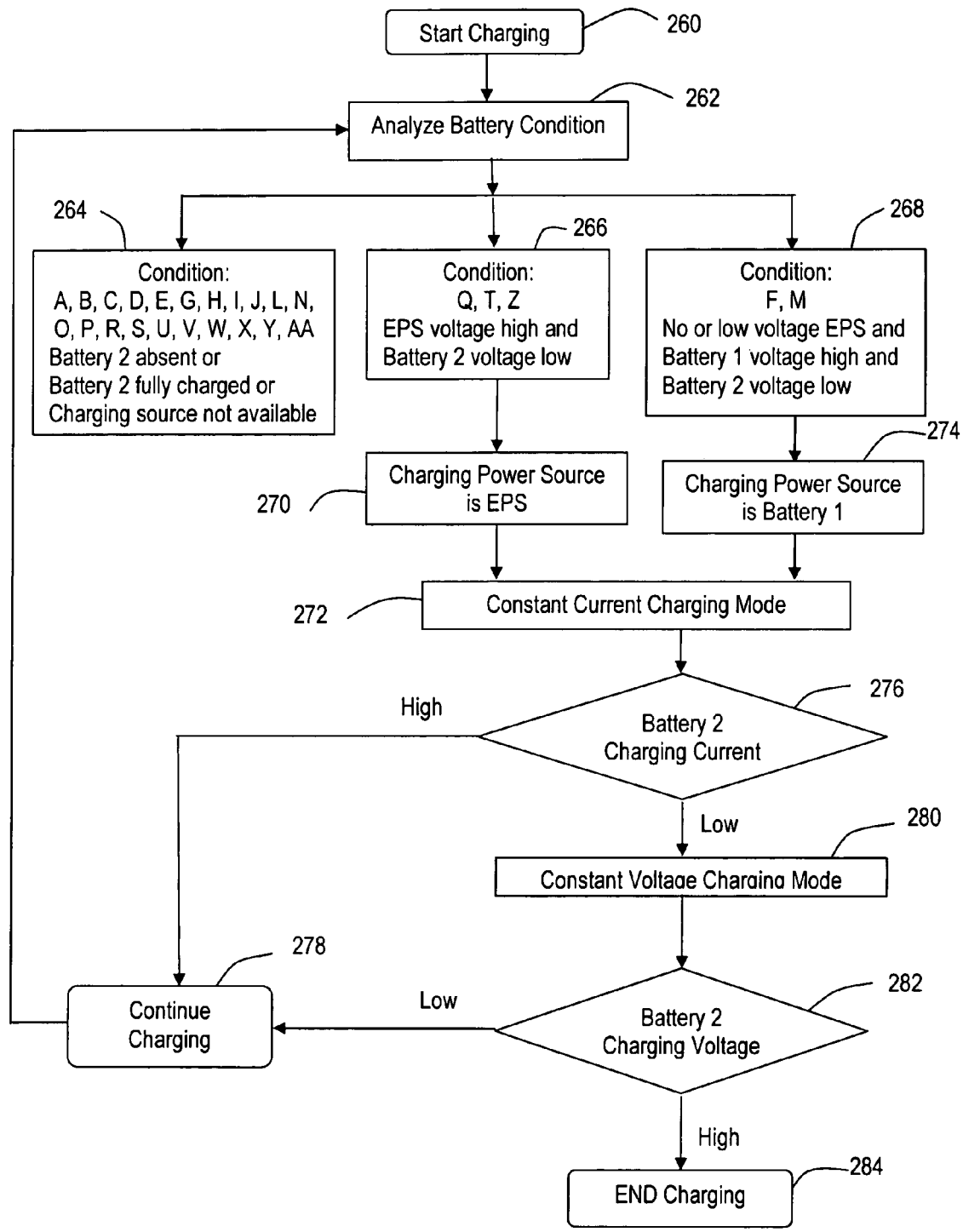

Refer now to FIGS. 6A-6D which illustrate another method executed by the EMS 50 for operating a power source system using a power distribution apparatus to manage a plurality of power sources and provide power from the plurality of sources to a plurality of devices. In this method, when at least one power source is connected to the power source system 100, the method begins execution in step 200 and transitions to step 202 to monitor the flow of power provided to one or more loads. This step is illustrated in FIG. 6C and explained in more detail below. The method then enters decision 206, testing whether power continues to be delivered to one or more loads. If not, the method exits to step 208 and ends. If power continues to be delivered, the method exits to step 210, where a flow of charging current provided to one or more secondary batteries is monitored and managed. This step is illustrated in FIG. 6D and explained in more detail below. From step 210, the method transitions to decision 212 to test whether charging current for one or more secondary batteries is available or needed. If charging current is needed and is available, the negative exit is taken from decision 212 and the method returns to step 202. If charging current is not needed, or is not available, the method transitions through step 214 back to step 202.

FIG. 6B illustrates a background process that the EMS 50 runs continuously to analyze the condition of batteries of the power source system 100. The process starts in step 220 and transitions to decision 221 to test whether there is an external power source other than batteries connected to the power source system 100. If not, the process takes the negative exit and transitions to decision 222. Otherwise, the positive exit is taken and the voltage level delivered by the external source is measured. Then, in decision 222, the process checks for the connection of a first battery (presumed to be a primary battery). If the first battery is not connected, the process transitions to decision 224. Otherwise, the first battery is connected and the process takes the positive exit to step 225 where the level of voltage delivered by the first battery is measured. Then, in decision 224, the process checks for the connection of a second battery (presumed to be a secondary battery). If the second battery is not connected, the process transitions to step 226. Otherwise, the second battery is connected and the process takes the positive exit to step 226 where the battery condition of the system 100 is analyzed. In analyzing the battery condition, the process has access to a lookup table 228 (retained in storage or memory, neither shown). The table 228 has four columns. The first column ("Condition") contains a condition code. The next column ("Ex. Power") contains the possible values measured in step 223 of the level of power provided by an external source other than the first or second battery. The third column ("Battery 1 Voltage") contains the possible values measured in step 225 of the level of power provided by the first battery. The fourth column ("Battery 2 Voltage") contains the possible values measured in step 227 of the level of power provided by the second battery. The table 228 encodes system power source conditions, for example, by mapping specific condition combinations to power condition codes (in the "Condition" column). In this example, a power source condition is a data structure having a plurality of fields, in this case three, in which each field signifies a measured condition of a respective power source. For example, the ninth row of the table 228 has a power source condition (Ex. Power Voltage Low/Battery 1 Voltage Low/Battery 2 Voltage None) which maps to condition code I. The process returns and sends a condition code in step 229. Because the power source connection conditions of the system 100 can change while the system operates, the process of FIG. 6B cycles continuously.

In FIG. 6C, the method of FIG. 6A executes step 202 as follows. Powering commences in step 240 and the condition code reported according to the process of FIG. 6B is analyzed in step 242. From step 242, a transition to one of four branches is followed based upon the value of the condition code. The four branches are entered through steps 246, 248, 250, and 252, respectively. The condition codes which cause the transition to any particular branch are shown in the steps. For example, if condition code is reported, the method transitions to step 246 because an external power source other than the first and second batteries is connected to the system 100. From here, the method transitions to step 247, designating the external power source as the primary power source. For example, if condition code E is reported in step 242, the method transitions to step 248 because the first battery is providing the highest level of power to the system 100. From here, the method transitions to step 249, designating the first battery as the primary power source. For example, if condition code D is reported in step 242, the method transitions to step 250 because the second battery is providing the highest level of power to the system 100. From here, the method transitions to step 251, designating the second battery as the primary power source. From any of steps 247, 249, and 251, the method transitions to step 254, maintaining the system 100 in a power delivery mode of operation. However, if condition A (or B, C, H, I, or J) is returned in step 242, no power source is connected to, or providing power to, the system 100. In this case, the method conditions the system 100 to stop providing power in step 256.

In FIG. 6D, the method of FIG. 6A performs step 210, executing a process to manage the provision of charging current to the second battery from the external power source or from the first battery. The process starts in step 260, transitioning to step 262 in which a power condition code is returned by the process of FIG. 6B. From step 262, a transition to one of three branches is followed based upon the value of the condition code. The three branches are entered through steps 264, 266, and 268, respectively. The condition codes which cause the transition to any particular branch are shown in the steps. If any code listed in step 264 is reported, the method transitions to step 264 because the second battery is not connected, the second battery is fully charged, or there is no other source with which to charge the second battery; in that case, no charging takes place. If any code listed in step 266 is reported, the method transitions to step 266 because an external power source is connected, and the second battery is low. From here, the method transitions to step 270 causing the EMS 50 to set the switches 41 of FIG. 4 to provide charging current to the second battery from the external power source. The method then transitions to step 272 in which a constant current charging mode is established. If any code listed in step 268 is reported, the method transitions to step 268 because an external power source is not connected, the second battery is low, and the first battery is high. From here, the method transitions to step 274 causing the EMS 50 to set the switches 41 of FIG. 4 to provide charging current to the second battery from the first battery. The method then transitions to step 272 in which the constant current charging mode is established. From step 272, the process transitions to decision 276 where the level of charging current provided for the second battery is tested. If the level is high, the positive exit is followed and the charging of the second battery continues in step 278 while the process cycles again through step 262. If the charging current level measured indecision 276 is low, the process transitions to step 280 where a constant voltage charging mode is established and from where the process transitions to decision 282 where the level of charging voltage for the second battery is measured. If the voltage level measured in decision 282 is low, the process transitions to step 278 and cycles again through step 262. Otherwise, if the voltage level measured in decision 282 is high, the second battery is deemed fully charged and the process ends in step 284.

While the power distribution apparatus and power source system have been described for use with electrochemical storage devices, it should be understood that it is not limited thereto, and other power sources, such as superconducting magnets and ultra-capacitors, may be used.

In another embodiment of the power distribution apparatus in which the flexibility of the above described embodiments is not needed, a secondary battery is permanently attached to the energy management system. The power source system using this embodiment of the power distribution apparatus has a battery inlet connected to the energy management system and adapted to detachably connect a primary battery; this battery inlet may be adapted to detachably connect a secondary battery when a primary battery is not attached.

In yet another embodiment of the power source system, a primary battery and secondary battery are permanently attached to the energy management system. The primary battery comprises multiple replaceable cells housed within an accessible interior of a battery case for ease of replacement.

The specific implementations disclosed above are by way of example and for enabling persons skilled in the art to implement the invention only. We have made every effort to describe all the embodiments we have foreseen. There may be embodiments that are unforeseeable and which are insubstantially different. We have further made every effort to describe the methodology of this invention, including the best mode of practicing it. Any omission of any variation of the method disclosed is not intended to dedicate such variation to the public, and all unforeseen, insubstantial variations are intended to be covered by the claims appended hereto. Accordingly, the invention is not to be limited except by the appended claims and legal equivalents.

What is claimed is:

1. A power distribution apparatus comprising:
   an energy management system;
   a first battery inlet connected to the energy management system and adapted to detachably connect a primary battery to the energy management system;
   a second battery inlet connected to the energy management system and adapted to detachably connect a secondary battery to the energy management system;
   a plurality of outlets connected to the energy management system, each of the outlets adapted for detachably connecting to a device requiring power; and
   a charging source selector for selecting a charging source from among a plurality of charging sources that are each for recharging a secondary battery connected to one of the battery inlets.

2. The apparatus of claim 1 wherein the energy management system comprises a power source selector for selecting a power source for providing power for a device connected to one of the outlets.

3. The apparatus of claim 1 wherein the energy management system further comprises a charge controller for controlling the magnitude of a charge current to recharge a secondary battery connected to one of the battery inlets.

4. The apparatus of claim 1 wherein the energy management system further comprises a measuring device for measuring remaining capacity in a battery connected to at least one of the inlets.

5. The apparatus of claim 4 further comprising an indicator connected to the energy management system for conveying the measured remaining capacity.

6. The apparatus of claim 4 further comprising a bus connected to the energy management system for relaying the measured remaining capacity to a battery connected to one of the battery inlets.

7. The apparatus of claim 1 wherein the first battery inlet is adapted to detachably connect a secondary battery when a primary battery is not attached.

8. The apparatus of claim 1 wherein the second battery inlet is adapted to detachably connect a primary battery when a secondary battery is not attached.

9. The apparatus of claim 1 further comprising an external power source inlet.

10. A power source system comprising:
    an energy management system;
    a first battery inlet connected to the energy management system and adapted to detachably connect a primary battery to the energy management system;
    a second battery inlet connected to the energy management system and adapted to detachably connect a secondary battery to the energy management system; and
    a plurality of outlets connected to the energy management system, each of the outlets adapted for detachably connecting to a device requiring power;
    a first battery detachably connected to the first inlet;
    a second battery detachably connected to the second inlet; and
    a charging source selector for selecting a charging source from among a plurality of charging sources that are each for recharging the second battery detachably connected to the second inlet.

11. The apparatus of claim 10 wherein the first battery is included in the plurality of charging sources.

12. The power source system of claim 10 wherein the first battery is a primary battery and wherein the second battery is a secondary battery.

13. The power source system of claim 10 wherein at least one of the first and second batteries is a fuel cell.

14. The power source system of claim 10 wherein the first battery is not a fuel cell and the second battery is not a fuel cell.

15. The power source system of claim 10 further comprising an external power source inlet.

16. A power source system comprising:
    an energy management system;
    a primary battery connected to the energy management system;
    a secondary battery connected to the energy management system; and
    a plurality of outlets connected to the energy management system, each of the outlets adapted for detachably connecting to a device requiring power;
    wherein the energy management system comprises:
       a power source selector for selecting a power source for providing power for a device connected to one of the outlets;
       a charging source selector for selecting a charging source form among a plurality of charging sources that are each for recharging the secondary battery;
       a charge controller for controlling the magnitude of a charge current to recharge the secondary battery; and
       a measuring device for measuring remaining capacity in at least one of the batteries.

17. The power source system of claim 16 further comprising an indicator connected to the energy management system for conveying the measured remaining capacity.

18. The power source system of claim 16 further comprising a bus connected to the energy management system for relaying the measured remaining capacity to at least one of the batteries.

19. The power source system of claim 16 wherein the primary battery is detachably connected to the energy management system.

20. The power source system of claim 16 wherein the primary battery comprises replaceable cells.

21. The power source system of claim 16 further comprising an external power source inlet.

22. A kit comprising:
    power distribution apparatus with:
        an energy management system;
        a first battery inlet connected to the energy management system and adapted to detachably connect a primary battery to energy management system;
        a second battery inlet connected to the energy management system and adapted to detachably connect a secondary battery to the energy management system; and
        a plurality of outlets connected to the energy management system, each of the outlets adapted to detachably connect a device requiring power;
        a charging source selector for selecting a charging source from among a plurality of charging sources that am each for recharging a secondary battery connected to one of the battery inlets;
    a first battery for detachably connecting to the energy management system via the first inlet;
    a second battery for detachably connecting to the energy management system via the second inlet; and
    a device for detachably connecting to at least one of the outlets.

23. The kit of claim 22 wherein the first battery is a primary battery and wherein the second battery is a secondary battery.

24. The kit of claim 22 wherein the device comprises an electrically-powered device.

25. The kit of claim 22 wherein the power distribution apparatus further comprises an external power source inlet.

* * * * *